MAGNETIC MEMORY ELEMENTS AND MATRICES

Filed Jan. 31, 1963 3 Sheets-Sheet 1

INVENTOR
MICHAEL G. HARMAN
BY Louis A. Kline
HIS ATTORNEY

MAGNETIC MEMORY ELEMENTS AND MATRICES

Filed Jan. 31, 1963 3 Sheets-Sheet 2

INVENTOR
MICHAEL G. HARMAN
BY Louis A. Kline
HIS ATTORNEY

June 6, 1967 M. G. HARMAN 3,324,462

MAGNETIC MEMORY ELEMENTS AND MATRICES

Filed Jan. 31, 1963 3 Sheets-Sheet 3

INVENTOR
MICHAEL G. HARMAN

BY Louis A Kline

HIS ATTORNEY 3,324,462

MAGNETIC MEMORY ELEMENTS AND MATRICES

Michael Godfrey Harman, Stroud Green, London, England, assignor to The National Cash Register Company, Dayton, Ohio, a corporation of Maryland Filed Jan. 31, 1963, Ser. No. 255,265
12 Claims. (Cl. 340—174)

The present invention is concerned with magnetic memory elements having a plurality of write means and preferably also a plurality of read means, and with matrices formed of such elements.

A standard toroidal ferrite core can have a plurality of drive windings and a plurality of gated sense windings coupled thereto, and thus in a sense it may have a plurality of both read and write means. However, in a memory matrix constructed of such cores this is not so. One complete word may be written in or read from such a matrix in parallel: but it is not possible either to read two words simultaneously from two random addresses, or to write two words simultaneously in two random addresses. The best that can be done using known techniques is to split the matrix into two independent parts; the addresses of the two words being operated on must then lie one in each part. The two addresses are therefore no longer random, and gnerally it will be impossible to programme a computer in such a manner that two words are rarely or never required simultaneously from two addresses in the same part of a split matrix used therein. It is possible to split the matrix into several parts, but this will require multiplication of driving and auxiliary equipment without solving the problem in a completely satisfactory manner.

The present invention completely overcomes this problem, by providing a magnetic element capable of being used in a matrix in which a plurality of words may be written or read in parallel, simultaneously, and at random addresses. The maximum number of words which can be written simultaneously need not equal the maximum number of words which can be read simultaneously. Reading is at worst partially destructive, since a word may be read by any combination of read means simultaneously, and in some embodiments a "restore" winding may be used to restore the word completely after reading.

It has become known to use a device known as a transfluxor, which is basically a toroidal core with a small aperture therein dividing the toroidal path into two equal branches. This can have only one read and write means associated with it. It has also become known to provide a transfluxor with a plurality of small apertures spaced around the main aperture, each small aperture having an individual read and sense winding coupled thereto. This enables a matrix to be constructed wherein words may be read simultaneously from several randomly chosen addresses. In order to write more than one word simultaneously in this known matrix, however, it is necessary to split the write windings into several independently controlled portions, each portion controlling a different part of the matrix. Thus it is not possible to write two words simultaneously in two randomly chosen addresses in this matrix.

The basic object of this invention, then, is to provide a magnetic element having a plurality of independent write means and capable of being used in a matrix in which a plurality of words can be written simultaneously at randomly chosen addresses. For the sake of completeness, a fairly detailed description will also be given of various forms of read means which permit dandom simultaneous readout of a plurality of words.

Thus according to the present invention there is provided a bistable magnetic element comprising a multi-apertured device of material of high squareness ratio including a storage flux path and a plurality of write legs coupled thereto, each write leg including one or more write windings and one or more enable windings and being so constructed that only the coincident and transitory energization of the enable winding or a predetermined combination of the enable windings with a current or currents of predetermined polarity and of the write winding or windings switches the flux in the storage path to a direction dependent on the polarity of the current or currents through the write winding or windings, the write legs operating independently of each other.

The invention will be more clearly understood, and various objects and characteristics will become apparent, from the following detailed description taken in conjunction with the drawings, in which—

FIGS. 1A to 1E illustrate a write leg and the operation thereof,

Figure 9:
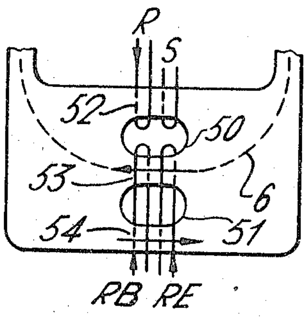
Figures 6, 7:
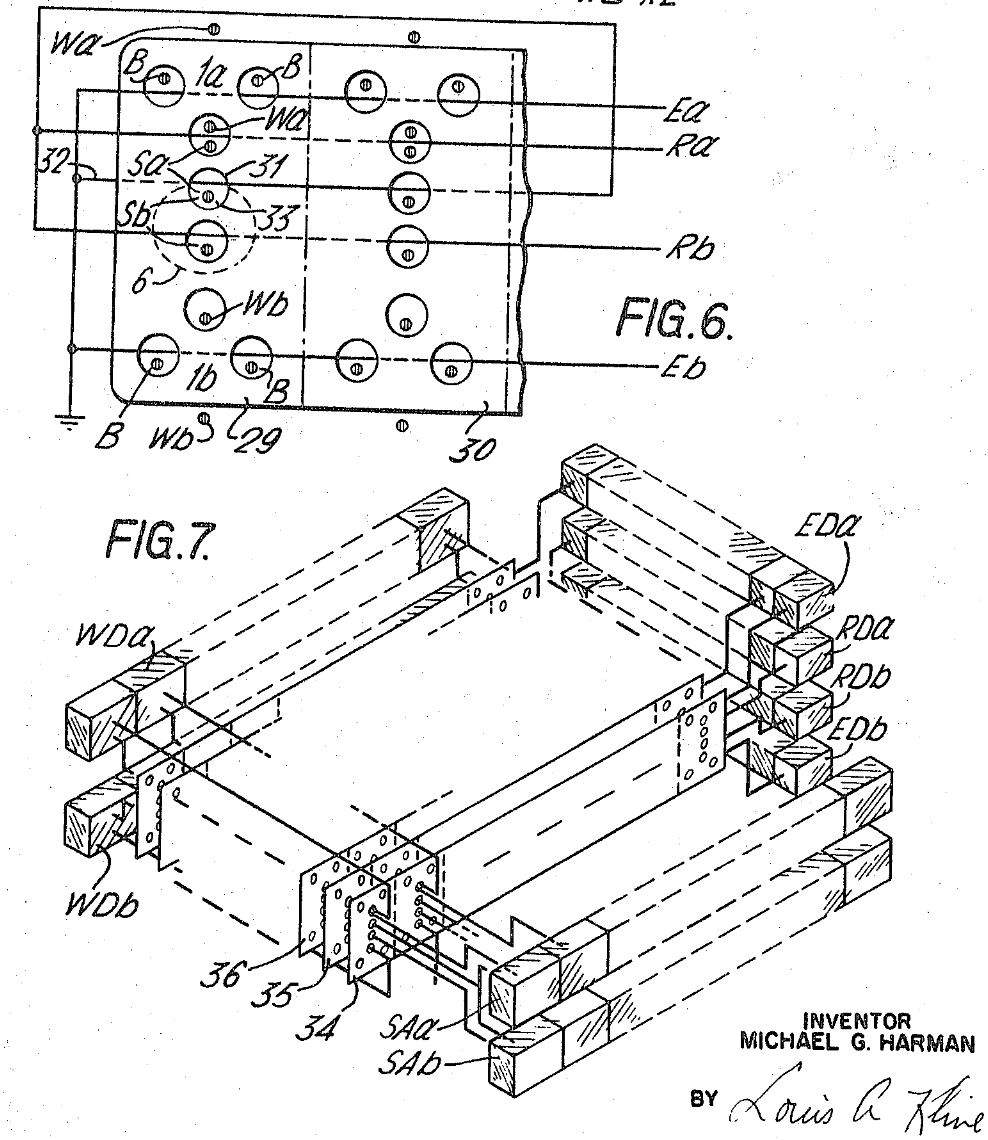
Figure 5:
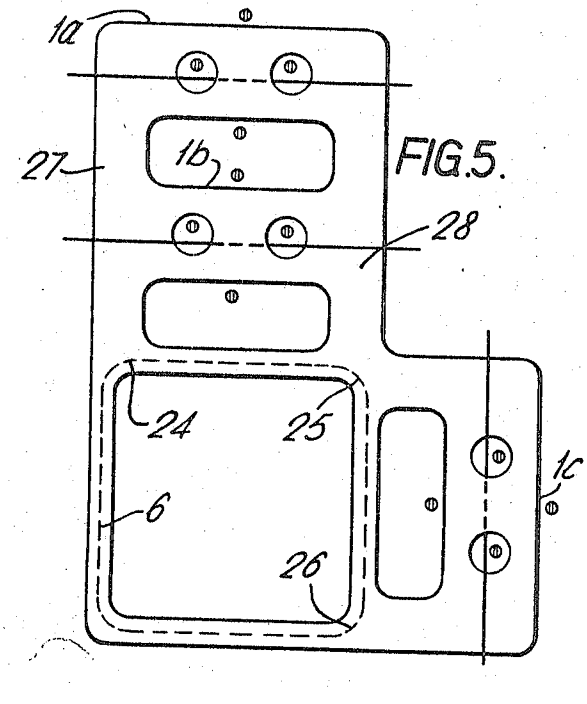

FIG. 5 illustrates the manner in which several write legs may be connected to a single storage loop, FIG. 6 illustrates the manner in which several elements may be assembled in a row, FIG. 7 illustrates the manner in which several rows of elements may be assembled in a matrix, FIGS. 8A to 8F show a further form of write leg and the operation thereof, and FIG. 9 shows a further form of read means in a storage loop.

The same scale is used for all of FIGS. 1 to 6, FIG. 8 and FIG. 9.

The magnetic material used for the elements of the present invention is preferably of the high resistivity or ferrite type, to avoid eddy current effects, and must have a squareness ratio (ratio of remanent flux $B_r$ at zero field to satuartion flux $B_m$ at large field) substantially equal to one. The field required for complete switching of the material may, however, be many times greater than the field at which switching begins. The technique known generally as "flux switching" is used: consequently the currents used may be arbitrarily large, resulting in extremely rapid operation, and the tolerance limits on the currents are generally wide.

It will be assumed herein that the various forms of the element are constructed from a uniform flat sheet of ferrite, with boundaries and apertures cut vertically through the sheet. This limitation simplifies explanation and permits the devices to be constructed easily: furthermore, no important advantages would be gained by using a more general form, with the one exception that ridges on the surface of the sheets are useful in one "plated wiring" technique.

Figures 1, 2, 3:
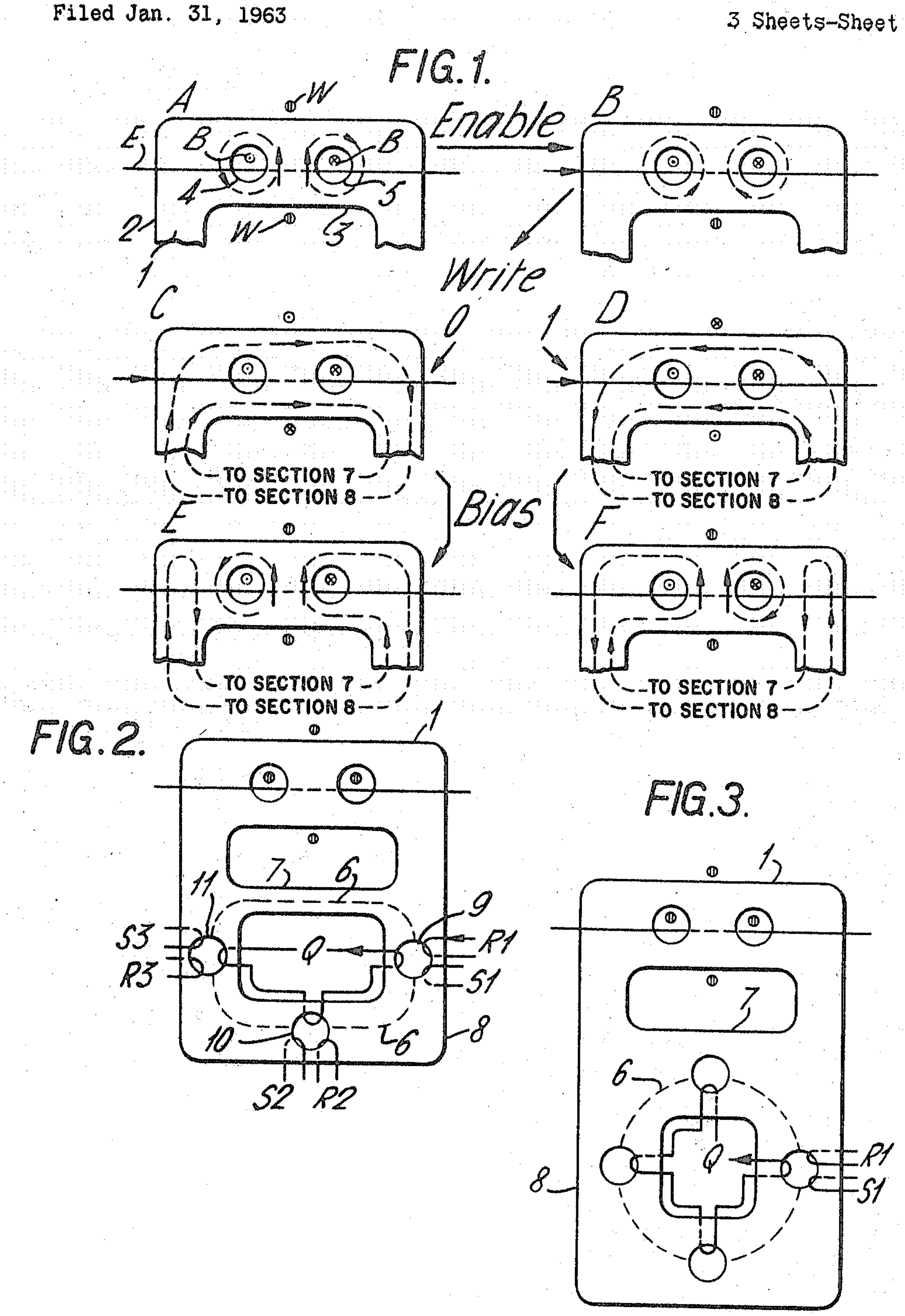
FIGS. 2 to 4 illustrate various forms of read means in a storage loop.

Referring to FIG. 1, the construction and operation of a drive leg will be explained. The drive leg 1, FIG. 1A, has two boundaries 2 and 3 and includes two apertures 4 and 5. The dimensions are such that the widths of the four branches of the drive leg between aperture 4 and boundary 2, aperture 4 and boundary 3, aperture 5 and boundary 2, and aperture 5 and boundary 3 are all equal, say of width $x$; the total width of leg 1, between boundaries 2 and 3, is nowhere less than $2x$, and the distance between the nearest points of apertures 4 and 5 is at least $2x$. An enable winding E passes through apertures 4 and 5 as shown; a bias winding BB passes through apertures 4 and 5 in a similar manner to the enable winding E, the wires of the bias winding being seen end on; and a write winding WW encircles the leg 1.

In operation, a steady current is passed through the bias winding BB, flowing up through aperture 4 and down through aperture 5 as indicated. This produces a steady MMF indicated by the full arrows between apertures 4 and 5, and a flux pattern indicated by the dashed lines around these apertures. In this state, any current passing through the write winding will not affect the flux pattern in the leg.

In order to use the leg 1 for writing, a current substantially equal and opposite to the bias current is passed through the enable winding E, as shown in FIG. 1B. This removes the MMF shown in FIG. 1A but leaves the flux pattern unchanged. If the write winding is now energized to write "0" or "1," as shown in FIGS. 1C and 1D respectively, an MMF will be produced as shown by the full arrows and will cause the entire leg to be saturated with a unidirectional flux as shown by the dashed lines. This will affect the storage loop in a manner discussed below. At the termination of the applied write and enable currents, the bias current re-establishes the MMF shown in FIG. 1A. This tends to re-establish the flux pattern of FIG. 1A. This will result in a partial reversal or "kidneying" of the flux patterns of FIGS. 1C and 1D, the resultant patterns being shown by the dashed lines in FIGS. 1E and 1F respectively.

The enable winding may obviously be omitted if means are provided for de-energizing the bias winding.

The write leg may alternatively include only one aperture such as aperture 4, dividing the leg into two portions each of width $x$, with both the bias winding and the enable winding coupled to the leg in a figure-of-eight manner, each winding passing through the single aperture twice. The write winding will encircle the entire leg as in the case illustrated.

It is evident that a write leg operates when the single enable winding and the write winding are energized simultaneously. It will be realized that a more powerful method of selection is to utilize, say, $n$ enable windings, each passing through apertures 4 and 5 and each of which may be energized with a current equal to one $n$th of the bias current; are alternatively to connect $n$ write legs in series, a single write winding being common to all. With either of these arrangements, writing will only be accomplished when the write winding and all the $n$ enable windings are simultaneously energized.

FIG. 2 illustrates the manner in which a write leg is used to write information in a storage loop, and one method of reading out information. The figure shows a write leg 1 connected to a storage loop 6 indicated by the dashed lines, the storage loop consisting of two sections 7 and 8. Each of the sections 7 and 8 has an effective width $x$ at its narrowest point. The section 8 contains three apertures 9, 10, and 11, each of which divides the section 8 into two branches each of width $x/2$. Each of apertures 9, 10, and 11 has a read winding and a sense winding passing through it and coupled to the outer branch of the section 8, and a restore winding Q may be coupled through each aperture to the inner branch of the section 8 as shown.

When a "0" is to be written in the storage loop 6, the enable and write windings of write leg 1 are energized to produce a left-to-right MMF and flux therein, as shown in FIG. 1C. This flux flows from right to left along the sections 7 and 8. These sections are substantially saturated, their combined width, $2x$, being equal to the effective width of the write leg 1. When the enable current in the write leg ceases, the flux is "kidneyed," as indicated by the dashed lines around the aperture 5 of FIG. 1E, one half of it being reversed. This reversal occurs along the shortest possible route, i.e. along the section 7. The storage loop 6 is now substantially saturated with clockwise flux, representing "0." Similarly, the writing of "1" produces an anti-clockwise flux in path 6. When a "1" is stored in the storage loop 6, the flux is "kidneyed," as indicated by the dashed lines around the aperture 4 of FIG. 1F. The flux path will in fact include excursions up the sides of the write leg, but this is immaterial to the operation of the device.

In order to read the information in the storage loop, a current pulse is passed through, say, read winding R1, as shown, to establish a clockwise flux through at least that branch of the storage loop passing outside aperture 9. If a "0" is stored, no flux change will occur, and no signals will appear on any of the sense windings S1, S2, and S3. If a "1" is stored, then half the flux around the storage loop will be reversed. The flux will reverse along the shortest possible route, passing outside aperture 9 but inside apertures 10 and 11. Hence a signal will be induced on sense winding S1 but not on sense windings S2 and S3. The information held in the storage loop is now no longer accessible to read winding R1, but the flux passing outside the apertures 10 and 11 is still undisturbed. Hence a subsequent energization of windings R2 and/or R3 will (provided a "1" is stored) cause reversal of flux around apertures 10 and/or 11 respectively, and a signal will be induced on sense windings S2 and/or S3 respectively. It is therefore evident that the storage loop may be read by all read windings, and that this reading may be simultaneous, sequential, or both; but that each read winding may be used once only.

If a "0" is stored, the flux in the storage loop is clockwise around the storage loop on both sides of each aperture. If a "1" is stored the flux passes anti-clockwise around the outside of apertures that have not been used for reading, and clockwise outside and anti-clockwise inside apertures that have been used for reading. If a restore winding Q is provided and energized as shown, a clockwise flux will be produced on the inside of all the apertures 9, 10, and 11. Thus the overall flux pattern will be unchanged if a "0" is stored: the flux passing inside all apertures will be reversed if a "1" is stored and has not previously been read: the flux passing inside an aperture will be unchanged if a "1" is stored and has been read but not by that aperture: and the flux past an aperture that has been used to read a stored "1" will be reversed both inside and outside the aperture. Thus the result of energizing the restore winding Q is to establish a clockwise flux passing inside all the apertures 9, 10, 11, and a clockwise or anti-clockwise flux passing outside the apertures according as "0" or "1" is stored. The stored bit may now be read by any combination of read windings: so the winding Q in effect restores the stored information to the storage loop after it has been read.

If a restore winding is used, the dimensions of the element must be such that flux reversal occurs as described above and not along some other route. This means that, in the general case, the apertures must be spaced sufficiently far apart around the storage loop 6 for the inner perimeter of the storage loop to exceed the sum of the perimeters of all the apertures. This condition may be relaxed if, for example, only one read winding is energized at a time and the restore winding is always energized after each reading.

In FIG. 3 there is shown an improved form of storage loop using a restore winding. The storage loop 6 consists of two sections 7 and 8, as before, each of which must contain at least one aperture, one aperture being shown in section 7 and three in section 8. Read and sense windings are coupled to these apertures in a manner similar to that shown in FIG. 2. Each aperture divides the section in which it lies into an inner and an outer branch, each of width $x$ (compared with $x/2$ in FIG. 2). Each aperture has a read winding and a sense winding passing through it and coupled to the outer branch of storage loop 6. A normally energized restore winding Q is coupled to all inner branches of the sections 7 and 8, as shown, and produces a clockwise flux across the inner half of the width of the storage loop 6. Thus during writing, flux can only be switched in the outer branches of storage loop 6, and a clockwise or anti-clockwise flux representing "0" or "1" respectively is established in these outer branches. For reading, winding Q is de-energized and any selected group of read windings energized. After reading, the Q winding is re-energized, and the information is thereby restored, or new information may be written in.

In this embodiment also, the inner perimeter of the storage loop must exceed the sum of the perimeters of the read apertures.

In the embodiments describd with refernce to FIG. 2, the read and sense windings are coupled to the outer parts of the storage loop. In the embodiment shown in FIG. 3, this limitation does not hold. In the embodiment of FIG. 3, any pair or pairs of read and sense windings may be coupled to the inner part of the storage loop, the restore winding Q being coupled to the outer part of the storage loop at the respective aperture or apertures.

Figure 4:
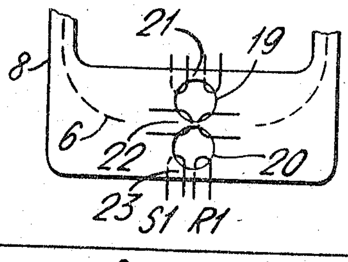

The various reading means in the arrangement so far described are arranged circumferentially around the storage loop. In FIG. 4 a radial arrangement of the reading means is shown. The section 8 of the storage loop has two apertures 19 and 20 arranged radially across it and dividing it into three branches 21, 22, and 23, as shown, each of width $x/3$. Each of these branches has an individual read winding and sense winding coupled thereto, those for branch 23 being R1 and S1 respectively.

Each read winding switches the flux through the branch it encircles to the "O" direction. Writing is performed as described with reference to FIG. 2, so that all the branches 21, 22, 23 carry parallel flux after writing. Clearly, no flux change will occur when "0" is read; and a flux reversal around a route of width $x/3$ and passing through only the selected one of branches 21, 22, 23 will occur when "1" is read, inducing a signal on only the associated sense winding.

It is evident that several read windings may be energized simultaneously, but that sequential energization will result in switching of flux between the branches 21, 22, and 23, and the inducing of false signals on the last-used reading means. It is also clear that, if the windings coupled to the innermost branch 21 are omitted, further sets of radially arranged apertures may be placed around the storage loop. This imposes obvious geometrical limitations to avoid flux switching along incorrect routes.

FIG. 5 shows the method by which several write legs may be connected to a single storage loop. Write legs 1$a$ and 1$b$ are connected in parallel to points 24 and 25 on the storage loop 6 by means of rails 27 and 28. Write leg 1$c$ is connected to points 25 and 26 on the storage loop. During writing by any leg, the other two legs are blocked by the bias currents through them, and the flux around the storage loop 6 will be switched to store "0" or "1." Each of the pairs of points 24 and 25, 25 and 26, must divide the storage loop 6 into two arcs of unequal length, so that the write legs are each connected to asymmetrically spaced points on the storage loop. This is to ensure that, at the end of the enable current, the flux always "kidneys" or reverses along the same arc.

In FIG. 8A, a further form of write leg 37 is shown having boundaries 38 and 39 and including two pairs of apertures 40 and 41, 42 and 43. These two pairs of apertures each divide the leg 37 into three branches 44 to 46 and 47 to 49 respectively, as shown, each of the branches 44 to 49 being of width $x$, and the width of the leg 37, i.e. the distance between boundaries 38 and 39 at their closest point, being also $x$. The distances between apertures 40 and 42, between apertures 41 and 43, and between each of the apertures 41 and 43 and the outer boundary 39 of the leg 37, are all at least $2x$. An enable winding E is coupled to the branches 45 and 48 in ppo-site directions, as shown. A write "0" winding $W_0$ and a write "1" winding $W_1$ are coupled to the branches 44 and 47, respectively, the wires of these windings being shown in cross-section.

In order to use the leg 37 for writing, it is necessary to energize simultantously both the enable windings and one or other of the two write windings. It may be noted that the write windings are driven only by unidirectional circuits. It will also be seen that the flux pattern established by writing does not change when the write and enable windings are de-energized. This means that the storage loop, the direction of flux around which indicates the bit stored, passes through the write leg 37. Thus in a complete element having a plurality of write legs of the type shown in FIG. 8A, the write legs are all connected in series, i.e. end-to-end, with the storage loop passing through them all, in distinction to the elements described above with reference to FIGS. 1 to 6. This means that the details of the readout arrangements may be different, as is discussed below.

In FIG. 8B the effect of energizing the enable winding E is shown. MMF's are produced in branches 45 and 48 as shown by the full arrows, and flux loops are set up around the apertures adjacent to these apertures as shown by the dashed lines. For writing "0," write winding $W_0$ is energized so as to produce a left-to-right MMF in branch 44 as shown in FIG. 8C; for writing "1," write winding $W_1$ is energized so as to produce a right-to-left MMF in branch 47, as shown in FIG. 9D. Thus for writing "0," branches 44 and 45 both have left-to-right MMF's induced in them, which, together with the right-to-left MMF in branch 48, produces the flux pattern shown by the dashed lines in FIG. 8C, the flux pattern extending along the entire length of the leg 37. Similarly, when a 1 is being written the flux pattern shown in FIG. 8D is set up, the flux extending through the leg in the opposite direction. When the windings are de-energized, the MMF's disappear but the flux pattern remains unchanged. There is no "kidneying" of flux such as occurred in the write leg of FIG. 1.

It will be seen that, after writing, branches 45 and 48 are saturated in the direction of the MMF's induced therein by the enable winding. Hence the flux pattern is not disturbed by any subsequent energization of this winding. If, however, the write "1" winding $W_1$ is energized when a "0" is written (or vice versa), then the flux pattern in the leg will be disturbed. This disturbance is illustrated in FIGS. 8E and 8F, for the two respective cases. The effect of this disturbance is seen to be to reverse the flux around aperture 42 or 40, respectively, the flux passing through the leg being undisturbed. The flux patterns in the leg produced as a result of this disturbance may be changed again if the enable winding is once again energized; this will restore the flux patterns substantially to those shown in FIGS. 8C and 9C, respectively.

Figure 8:
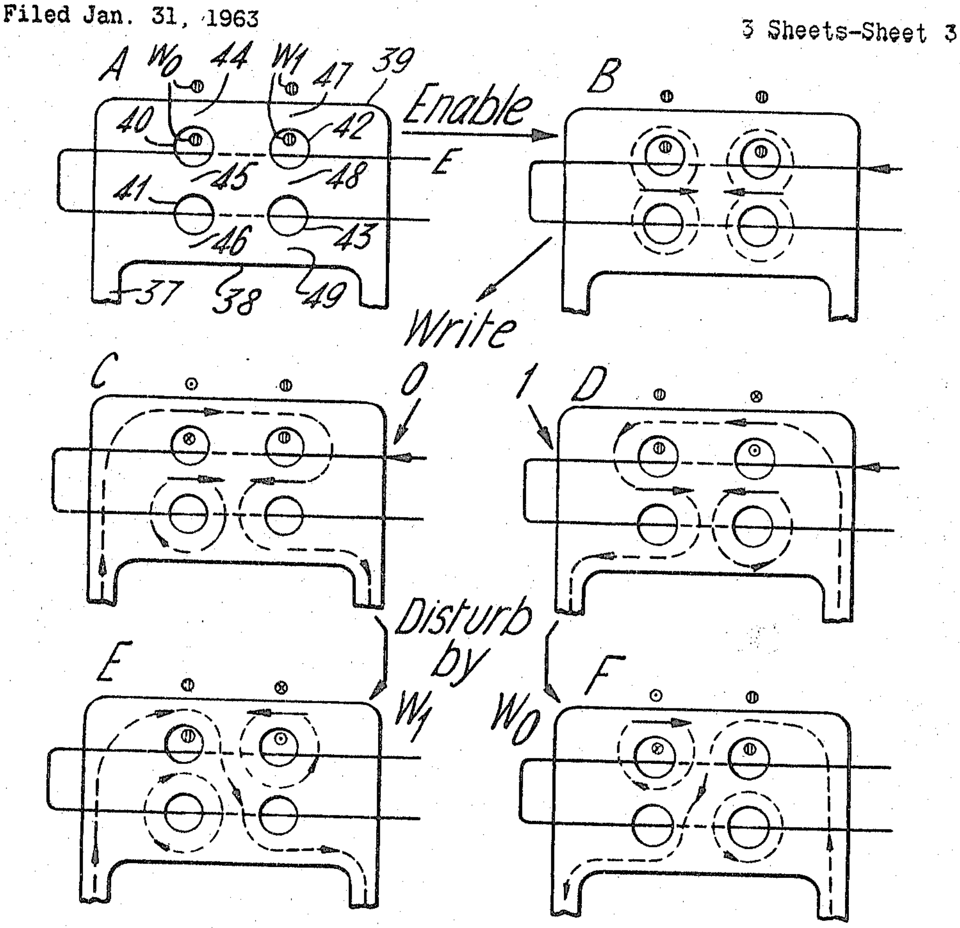

In FIG. 9 there is shown a reading arrangement which may be used with the write leg of FIG. 8. One or more of these read arrangements may be connected serially in a storage loop passing through a plurality of write legs of the FIG. 8 type. Two apertures 50 and 51 divide the storage loop 6 into three branches 52 to 54, as shown. A read bias winding RB and a read enable winding RE are each coupled in a figure-of-eight manner to branches 53 and 54 as shown, and a read winding R and a sense winding S are each coupled to branch 52 as shown. Read bias winding RB is permanently energized as shown, producing right-to-left and left-to-right MMF's and flux in branches 53 and 54 respectively, as shown.

For reading, read enable winding RE is energized with a current equal and opposite to that in read bias winding RB, so as to remove the MMF's from branches 53 and 54, and read winding R is energized so as to produce a right-to-left flux in branch 52. If a "0" is stored, then the flux in portion 52 is already right-to-left and no change of flux will occur; if a "1" is stored, then the flux in branch 52 is initially left-to-right, and flux reversal occurs around the aperture 50, i.e. in branches 52 and 53. Thus a signal is induced on the sense line if a "1" is stored. At the conclusion of reading, the windings R and RE become de-energized, and the MMF's due to winding RB reappear. These will act to restore the flux distribution to its original state, i.e. the flux distribution will remain unchanged if a "0" is stored but flux will be reversed again in branches 52 and 53 if a "1" is stored.

It is clear that if only the read enable winding RE is energized, then there are no resultant MMF's and no flux changes will occur. If, however, only the read winding R is energized, then right-to-left MMF's will exist in branches 52 and 53 and a left-to-right flux will exist in branch 54. If the currents are sufficiently large, it is possible that this may produce a flux reversal around the entire storage loop 6 when a "1" is stored. This will be more likely when there are several reading means of this type arranged around the storage loop and all have their read windings energized simultaneously. However, the distance around the storage loop will be relatively large, as the storage loop will contain at least two write legs of the FIG. 8 type connected in series; thus the current in the read windings needed to produce this type of false operation will generally be much greater than the minimum current required to produce correct operation.

It will be recognized that this type of read means may also be used in conjunction with write legs of the FIG. 1 type. In this case the problem of avoiding the above-mentioned type of false reading may be more difficult to overcome, requiring more careful control of the current applied to the read winding R (of FIG. 9).

It will further be recognized that the read means of FIGS. 2 and 4 may be applied to devices utilizing the write leg of FIG. 8 without modification, and that the various read means described here are by no means exhaustive of all possibilities.

It is obvious that the geometrical shape of the elements may be varied widely, provided that the flux paths are of the correct relative widths and lengths. (The width of a flux path is, of course, the width of the narrowest portion of the path.) There is no theoretical reason, for example, why a write leg of the FIG. 1 type should not lie inside the storage loop, being completely encircled by it; though this would, in practice, result in unduly long flux paths.

In FIG. 6 there is shown a row of magnetic elements 29, 30 . . . suitable for incorporation in a matrix. Element 29 comprises a storage loop 6 having two write legs 1*a*, 1*b* of the type shown in FIG. 1 connected to it and having a single read aperture 31 therein. Two read windings R*a* and R*b* and two sense windings S*a* and S*b* are coupled thereto in the manner of FIG. 4. The enable windings E*a* and E*b* and the read windings R*a* and R*b* are shown as being substantially parallel to the plane of the element. Since read windings R*a* and R*b* both pass through aperture 31, a common wire 32 may be used for both read windings, as shown. Similarly the wire 33, seen end on, is common to both the sense windings S*a* and S*b*. The bias and write windings for the write legs are arranged as described with reference to FIG. 1.

Adjacent to the element 29 there is shown a similar element 30. This is coupled to the read and enable windings as shown, the "0" and "1" directions of its storage loop being opposite to the respective directions for the storage loop of element 29. Clearly a row of elements can be formed with the same read and enable windings common to all elements. Such a row may be fabricated from a single strip of ferrite, the individual elements being spaced slightly apart to prevent interaction between elements. The read and enable windings may be "printed" or deposited on the strip in any suitable manner: such techniques are described, for example, by A. Guditz, "Three-dimensional Printed Wiring," Electronics, pp. 160–163, June 1, 1957, and by J. A. Rajchman, "Ferrite Apertured Plate for Random-Access Memory," Proc. EJCC, December 1956, pp. 107–115. It may be noted that multi-turn windings may be printed; this increases the inductance of the windings but reduces the driving currents needed.

In FIG. 7 there is shown, in a much simplified sketch, a matrix formed from a plurality of the strips described above. The strips 34, 35, 36, . . . are placed parallel to each other as shown. Each strip has associated therewith a pair of enable drivers and a pair of read drivers, corresponding drivers for all strips forming the driver blocks ED*a*, ED*b*, RD*a*, and RD*b*. Write and sense windings pass through corresponding apertures in all strips, the write windings being fed from the two blocks of bipolar write drivers WD*a*, WD*b*, and the sense windings feeding the two blocks of sense amplifiers SA*a* and SA*b*. A bias winding, not shown, passes parallel to the write windings through every write leg in the matrix.

Each strip is used to store a complete computer word. A two-step read-write cycle is used. During the write step, any one of the enable drivers in block ED*a* is energized, simultaneously with the energization of all the write drivers in block WD*a*. This results in writing a word in the selected strip. Simultaneously with this, another word may (but need not be) written in any other strip by means of one of the enable drivers in block ED*b* and the write drivers WD*b*. During the read step, energization of any one read driver in block RD*a* and any one in block RD*b* results in the selected words appearing, simultaneously and with all bits in parallel, at the outputs of the sense amplifier blocks SA*a* and SA*b* respectively. The same word can be read simultaneously by both the reading means.

A matrix of this type may be split to allow the multiplication of the read and/or write drivers while keeping the number of apertures in each element small. Thus a matrix using the strips of elements illustrated in FIG. 6 may consist of four portions, say I to IV. Four sets of write drivers will be provided say WD1 to WD4, connected to the four portions of the matrix as follows:

WD1 feeds portions I and III,
WD2 feeds portions II and IV,
WD3 feeds portions I and II,
WD4 foods portions III and IV, This permits up to four words to be written into the matrix simultaneously, though not at fully random addresses. The matrix may be similarly split for reading; the same or differently chosen portions may be used.

Such a matrix is particularly well adapted for use as a "switchboard" and central buffer memory and distributor unit in a computer. The gating of words between the various units of a computer may be accomplished entirely by the matrix, each unit of the computer having a write driver block and a sense amplifier block associated with it. Among the advantages offered by this system are: the elimination of electronic gating circuitry; the considerable parallelism of operation among the several units that is possible; and the ease with which words may be stored in the central buffer matrix in readiness for an imminent command.

It is also clear that a magnetic memory element has been described herein which is adapted for incorporation in a matrix in which several words may be written or read in parallel at random addresses.

What is claimed is:

1. A multi-apertured magnetic core data storage device, comprising:

(a) a closed low magnetic reluctance write loop, the write loop containing at least one write aperture therein, and (b) a closed low magnetic reluctance read loop, the read loop containing at least one read aperture therein, the write and read loops being configurated to coincide along a portion thereof, and (c) means to establish a steady bias magnetic flux configuration around each of the write apertures and a bias magnetomotive force condition in the vicinity of each of the write apertures, said means including electrical bias conductors positioned through each write aperture, and (d) means to establish a temporary zero bias magnetomotive force condition in the vicinity of the selected write aperture, and (e) means to establish a storage magnetic flux configuration that is directed around at least a portion of the read loop in one directional sense when a "0" is stored and in the opposite directional sense when a "1" is stored, said means including an electrical write conductor having sections that are coupled to the write loop in the vicinity of each of the write apertures, and (f) means to establish a read magnetic flux configuration in the vicinity of a selected read aperture, said means including electrical read conductors positioned through each read aperture, and (g) means, including electrical sense conductors positioned through each read aperture, to sense the magnetic flux configuration change that occurs in the vicinity of the selected read aperture due to the read magnetic flux configuration, said magnetic flux configuration change being indicative of the state of the storage magnetic flux configuration and being generative of induced electrical signals in the associated electrical sense conductor.

2. A device as in claim 1 wherein the means to establish the temporary zero bias magnetomotive force condition in the vicinity of a selected write aperture includes electrical enable conductors positioned through each write aperture.

3. A device as in claim 2 wherein means to re-establish a magnetic flux configuration of a predetermined sense around the read apertures following sensing of the read apertures is included, said means including an electrical restore conductor positoned through the read apertures.

4. A multi-apertured magnetic core data storage device, comprising:

(a) a plurality of low magnetic reluctance write loops, each write loop containing at least one write aperture therein, and (b) a closed low magnetic reluctance read loop, the read loop containing at least one read aperture therein, one write loop being configured to coincide with a portion of the read loop and each of the other write loops being configured to coincide with a portion of one other write loop, and (c) means to establish a steady bias magnetic flux configuration around each of the write apertures and a bias magnetomotive force condition in the vicinity of each of the write apertures, said means including electrical bias conductors positioned through each write aperture, and (d) means to establish a temporary zero bias magnetomotive force condition in the vicinity of the selected write aperture, and (e) means constructed to establish a storage magnetic flux configuration that is directed around at least a portion of the read loop in one directional sense when a "0" is stored and in the opposite directional sense when a "1" is stored, said means including an electrical write conductor having sections that are coupled to the write loop in the vicinity of each of the write apertures, and (f) means constructed to establish a read magnetic flux configuration in the vicinity of a selected read aperture, said means including electrical read conductors positioned through each read aperture, and (g) means including electrical sense conductors positioned through each read aperture to sense the magnetic flux configuration change that occurs in the vicinity of the selected read aperture due to the read magnetic flux configuration, said magnetic flux configuration change being indicative of the state of the storage magnetic flux configuration and being generative of induced electrical signals in the associated sense conductor.

5. A device as in claim 4 wherein the means to establish the temporary zero bias magnetomotive force condition in the vicinity of a selected write aperture includes electrical enable conductors positioned through each write aperture.

6. A device as in claim 5 wherein a means to re-establish a magnetic flux configuration of a predetermined sense around the read apertures following sensing of the read apertures is included, said means including an electrical restore conductor positioned through the read apertures.

7. A multi-apertured magnetic core data storage device, comprising:

(a) plurality of low magnetic reluctance write loops, each loop containing at least one write aperture therein, and (b) a separate closed low magnetic reluctance read loop, the read loop containing at least one read aperture therein, each of the write loops being configurated to coincide with separate equal-length portions of the read loop, and (c) means constructed to suplpy a steady bias magnetic flux configuration around each of the write apertures and a bias magnetomotive force condition in the vicinity of each of the write apertures, said means including electrical bias conductors positioned through each write aperture, and (d) means to establish a temporary zero bias magnetomotive force condition in the vicinity of the selected write aperture, and (e) means to establish a storage magnetic flux configuration that is directed around at least a portion of the read loop in one directional sense when a "0" is stored and in the opposite directional sense when a "1" is stored, said means including an electrical write conductor having sections that are coupled to the write loop in the vicinity of each of the write apertures, and (f) means to establish a read magnetic flux configuration in the vicinity of a selected read aperture, said means including electrical read conductors positioned through each read aperture, and (g) means, including electrical sense conductors positioned through each read aperture, to sense the magnetic flux configuration change that occurs in the vicinity of the selected read aperture due to the read magnetic flux configuration, said magnetic flux configuration change being indicative of the state of the storage magnetic flux configuration and being generative of induced electrical signals in the associated sense conductor.

8. A device as in claim 7 wherein the means to establish the temporary zero bias magnetomotive force condition in the vicinity of a selected write aperture includes electrical enable conductors positioned through each write aperture.

9. A device as in claim 8 wherein a means to re-establish a magnetic flux configuration of a predetermined sense around the read apertures following sensing of the read apertures is included, said means including an electrical restore conductor positioned through the read apertures.

10. A multi-apertured magnetic core data storage device, comprising:

(a) a plurality of low magnetic reluctance write loops, each write loop containing at least one write aperture therein, and (b) a separate closed low magnetic reluctance read loop, the read loop containing at least one read aperture therein, some of said write loops being configurated to coincide with separate equal-length portions of the read loop and each of the remainder of said write loops being configurated to coincide with a portion of one other write loop, and (c) means to establish a steady bias magnetic flux configuration around each of the write apertures and a bias magnetomotive force condition in the vicinity of each of the write apertures, said means including electrical bias conductors positioned through each write aperture, and (d) means to establish a temporary zero bias magnetomotive force condition in the vicinity of the selected write aperture, and (e) means to establish a storage magnetic flux configuration that is directed around at least a portion of the read loop in one directional sense when a "0" is stored and in the opposite directional sense when a "1" is stored, said means including an electrical write conductor having sections that are coupled to the write loop in the vicinity of each of the write apertures, and (f) means to establish a read magnetic flux configuration in the vicinity of a selected read aperture, said means including electrical read conductors positioned through each read aperture, and (g) means, including electrical sense conductors positioned through each read aperture, to sense the magnetic flux configuration change that occurs in the vicinity of the selected read aperture due to the read magnetic flux configuration, said magnetic flux configuration change being indicative of the state of the storage magnetic flux configuration and being generative of induced electrical signals in the associated sense conductor.

11. A device as in claim 10 in which the means to establish the temporary zero bias magnetomotive force condition in the vicinity of a selected write aperture includes electrical enable conductors positioned through each write aperture.

12. A device as in claim 11 wherein a means to reestablish a magnetic flux configuration of a predetermined sense around the following sensing of the read apertures is included, said means including an electrical restore conductor positioned through the read apertures.

References Cited

UNITED STATES PATENTS

| | | | |
|---|---|---|---|
| 2,898,581 | 8/1959 | Post | 340—174 |
| 3,019,419 | 1/1962 | Haynes | 340—174 |
| 3,126,530 | 3/1964 | Post | 340—174 |
| 3,164,812 | 1/1965 | Bobeck | 340—174 |
| 3,183,493 | 5/1965 | Vinal | 340—174 |
| 3,187,311 | 6/1965 | Wennstrom | 340—174 |

BERNARD KONICK, *Primary Examiner.*

M. S. GITTES, *Assistant Examiner.*

UNITED STATES PATENT OFFICE
CERTIFICATE OF CORRECTION

Patent No. 3,324,462 June 6, 1967

Michael Godfrey Harman

It is hereby certified that error appears in the above numbered patent requiring correction and that the said Letters Patent should read as corrected below.

Column 1, line 27, for "gnerally" read -- generally --; line 35, after "magnetic" insert -- memory --; line 68, for "dandom" read -- random --; column 2, line 36, for "satuartion" read -- saturation --; column 3, line 36, for "are" read -- or --; column 5, lines 65 and 66, for "pposite" read -- opposite --; line 71, for "simultantously" read -- simultaneously --; line 71, for "windings" read -- winding --; lines 73 and 74, for "circuits" read -- currents --; column 10, line 11, before "plurality" insert -- a --; line 19, for "suplpy" read -- supply --.

Signed and sealed this 9th day of January 1968.

(SEAL)
Attest:

EDWARD M.FLETCHER,JR.
Attesting Officer

EDWARD J. BRENNER
Commissioner of Patents